(12) United States Patent
Gray (10) Patent No.: US 11,496,570 B1
(45) Date of Patent: *Nov. 8, 2022

(54) SYSTEM FOR SHARING TANGIBLE OBJECTS

(71) Applicant: Omnicharge, Inc., Los Angeles, CA (US)

(72) Inventor: Gavin Gray, Marana, AZ (US)

(73) Assignee: Omnicharge, Inc., Los Angeles, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 17/174,632

(22) Filed: Feb. 12, 2021

Related U.S. Application Data (63) Continuation of application No. 16/587,296, filed on Sep. 30, 2019, now Pat. No. 10,951,714, which is a
(Continued)

(51) Int. Cl.
*H04L 67/125* (2022.01)
*H04L 9/40* (2022.01)
(Continued)

(52) U.S. Cl.
CPC ....... *H04L 67/125* (2013.01); *G06Q 30/0284* (2013.01); *H04L 63/102* (2013.01); *G06F 2009/45595* (2013.01); *G06Q 30/00* (2013.01)

(58) Field of Classification Search
CPC ..... H04L 67/125; H04L 63/08; H04L 63/102; H04L 63/104; G06Q 30/0284; G06Q 30/00; G06F 2009/45595; G06F 21/31
See application file for complete search history.

(56) References Cited

U.S. PATENT DOCUMENTS

| 1,000,889 A | 8/1911 | Bennett |
| 6,665,549 B1 | 12/2003 | Reed |

(Continued)

FOREIGN PATENT DOCUMENTS

| GB | 2528911 A | 10/2016 |
| WO | 2016020645 A1 | 2/2016 |

OTHER PUBLICATIONS

International Search Report and Written Opinion, dated Mar. 9, 2018, for International Application No. PCT/US2017/068545.

*Primary Examiner* — Hosuk Song
(74) *Attorney, Agent, or Firm* — Build IP, LLC; Robert V. Donahoe (57) ABSTRACT

A system is configured to provide managed services for deployment of shared tangible objects by an operator. The system includes cloud resources provided by the system administrator. In one embodiment, the cloud resources include a sharable-object command module configured to communicate signals employed in activating shared tangible objects for use when the end user is successfully authorized by the device activation module. The system includes an API provided by the system administrator. The API is configured to facilitate a communication of object activation signals from the sharable-object command module to allow the end user to use the shared tangible object. The same API is employed to facilitate the communication of object activation signals for different types of shared tangible objects that can be provided in different vertical markets.

19 Claims, 4 Drawing Sheets

Related U.S. Application Data continuation of application No. 15/614,737, filed on Jun. 6, 2017, now Pat. No. 10,476,965.

(60) Provisional application No. 62/439,419, filed on Dec. 27, 2016, provisional application No. 62/358,598, filed on Jul. 6, 2016, provisional application No. 62/346,083, filed on Jun. 6, 2016.

(51) Int. Cl.
*G06Q 30/02* (2012.01)
*G06F 9/455* (2018.01)
*G06Q 30/00* (2012.01)

(56) References Cited

U.S. PATENT DOCUMENTS

| | | | |
|---|---|---|---|
| 6,823,459 B1 | 11/2004 | Horikoshi et al. | |
| 8,618,770 B2 | 12/2013 | Baarman | |
| 9,071,606 B2 | 6/2015 | Braun et al. | |
| 9,537,994 B2 | 1/2017 | Baldasare et al. | |
| 9,538,384 B2 | 1/2017 | Donnellan et al. | |
| 9,557,889 B2 | 1/2017 | Raleigh et al. | |
| 9,569,638 B2 | 2/2017 | Zatko et al. | |
| 9,665,708 B2 | 5/2017 | Fanton et al. | |
| 9,942,087 B2 | 4/2018 | Guntal et al. | |
| 9,965,653 B2 * | 5/2018 | Rizzo | G06F 21/79 |
| 10,226,613 B2 * | 3/2019 | Chelak | A61M 39/20 |
| 10,291,575 B2 * | 5/2019 | Xing | H04L 63/08 |
| 10,476,965 B1 * | 11/2019 | Gray | H04W 8/18 |
| 10,650,167 B2 * | 5/2020 | Rizzo | G06F 21/71 |
| 10,939,141 B2 * | 3/2021 | Drako | H04N 21/21805 |
| 10,951,714 B1 * | 3/2021 | Gray | H04W 4/021 |
| 11,005,892 B2 * | 5/2021 | Manor | H04L 41/0893 |
| 2009/0181641 A1 | 7/2009 | Fiatal | |
| 2011/0258467 A1 | 10/2011 | Antoci | |
| 2012/0150670 A1 | 6/2012 | Taylor et al. | |
| 2013/0088192 A1 | 4/2013 | Eaton | |
| 2014/0232635 A1 | 8/2014 | Lee | |
| 2014/0375261 A1 | 12/2014 | Manova-Elssibony et al. | |
| 2016/0098770 A1 | 4/2016 | Chang et al. | |
| 2016/0100312 A1 | 4/2016 | Bell et al. | |

\* cited by examiner

FIG. 4

SYSTEM FOR SHARING TANGIBLE OBJECTS

BACKGROUND OF INVENTION

1. Field of Invention

This invention relates generally to apparatus, systems and methods for sharing tangible objects. More specifically, at least one embodiment, relates to apparatus, systems and methods for individuals to locate, share and return a tangible object.

2. Discussion of Related Art

Modern society has widely embraced the concept of sharing objects and services to reduce users' expenses and to more fully utilize resources. ZIPCAR and HUBWAY provide well known examples of shared transportation objects in automobiles and bicycles, respectively. Where objects are shared they are generally located in a "common area," that is, an area accessible to multiple users. Often, these common areas are open to the public such that anyone can access and utilize the shared object. In some cases, ZIPCAR as one example, a user employs web or mobile application ("mobile app") for the process of receiving a temporary use of the object in exchange for their payment.

Although the preceding and similar approaches are common today, each type of object requires the development of an intelligent cloud-connected hardware solution. Where a mobile app and/or cloud resources are utilized, each type of object requires the development of software to operate on the mobile device and/or remote servers for that particular application, respectively. Further, when multiple companies pursue the same market, each company expends resources to develop proprietary hardware and software solutions for "their" objects. This redundant approach results in each provider hiring hardware and software engineers to develop the proprietary solution. The approach also significantly increases costs and extends development cycles as each provider develops, tests, debugs and finally launches their proprietary solution(s).

The traditional approach to object sharing also requires a substantial capital investment by each object-sharing provider because the objects must be purchased before they can be outfitted for sharing. The approach creates a significant risk because the broad consumer acceptance required to pay for the preceding investment in engineering and capital equipment is not certain until well after roll out and launch of the object sharing business.

Figure 1:
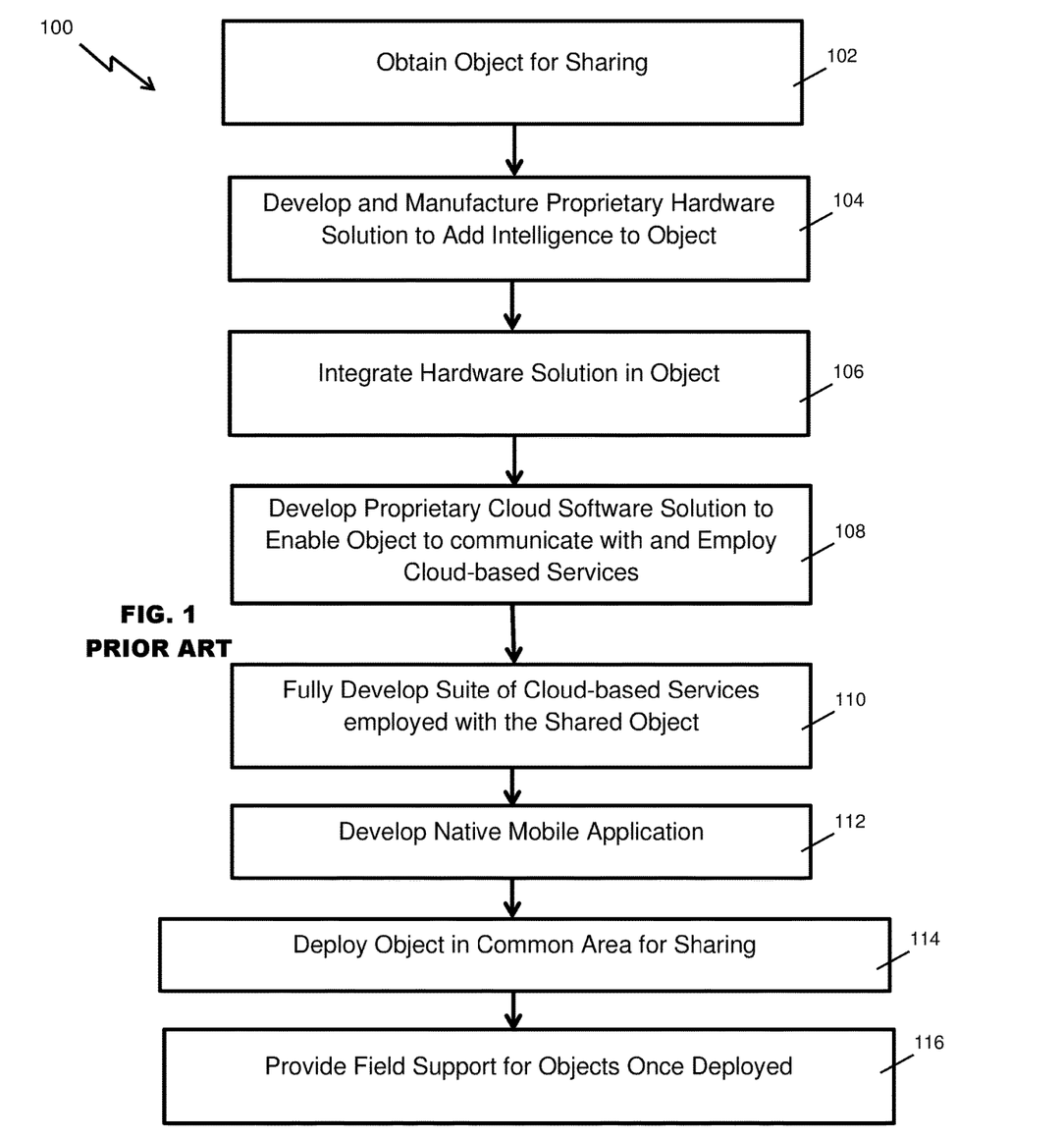
FIG. 1 illustrates a flow diagram of a prior art process.

FIG. 1 illustrates a flow diagram of a prior art process 100 by which a company operating an object-sharing business develops and deploys their own proprietary object-sharing system. The process 100 includes an act of obtaining an object for sharing 102, an act of developing and manufacturing a proprietary "intelligent" hardware solution 104, an act of integrating the hardware solution in the object 106, an act of developing a proprietary cloud software solution to enable the object to communicate with and employ cloud-based services 108, an act of fully developing a suite of cloud-based services employed with the shared object 110, an act of developing a native mobile application 112, an act of deploying the object in a common area for sharing 114 and an act of providing field support for the objects once deployed 116.

The process 100 is now described in greater detail. Typically, the act of obtaining an object for sharing 102 requires that the operator directly purchase or lease the objects to be shared. This approach necessarily ties up a substantial amount of the capital and/or negatively affects the cash flow of the company operating the object-sharing business. The process 100 moves to the act of developing and manufacturing a proprietary "intelligent" hardware solution 104. Here, the company operating the object-sharing business must directly hire product development employees or contractors to come up with a custom solution such that the shared objects are equipped to communicate with local or remote systems, for example, communicate with a mobile device and/or cloud resources. The following are some elements that are designed and built from scratch by the company operating the object-sharing business: design and manufacture of the electronic system to add intelligence to the object, for example, electronic system design/manufacture, printed circuit board (PCB) design/manufacture and firmware development; and mechanical product design and manufacturing as required to physically integrate the electronic system in the object; and software design for communication between the custom hardware solution and any cloud software solution developed by the company operating the object sharing platform.

The process 100 moves from the act of developing and manufacturing a proprietary "intelligent" hardware solution for the object 104 to the act of integrating the proprietary hardware solution in the object 106. That is, for each object that is to be deployed the custom hardware solution must be physically integrated into the object. These installations can be labor intensive and fraught with their own unique challenges. This is especially true for a company that is operating an object-sharing platform for the first time because they may have no previous background in hardware development.

The process 100 next moves from the act of integrating the proprietary hardware solution in the object 106 to the act of developing a proprietary cloud software solution to enable the object to communicate with and employ cloud-based services 108. This act requires that the company operating the object-sharing business develop a cloud platform that can be accessed to enable communication with the shared objects. This act may also require that the company operating the object-sharing platform develop a corresponding cloud communication system that is embedded in the sharable object for communication with the cloud. Here too, a team of programming professionals is required at great cost because individuals with the required skills are in such high demand.

The process 100 moves from the act of developing a proprietary cloud software solution to enable the object to communicate with and employ cloud-based services 108 to the act of fully developing the suite of cloud-based services employed with the shared object 110. Here, the process 100 addresses the various cloud-based services required by the company operating the object-sharing business and their customers. For example, the cloud-based services can include user login credentials, payment information and data analytics. Again, the company operating the object-sharing business is forced to create and integrate these resources into the cloud-software solution they provide at act 108.

The process 100 moves from the act of fully developing a suite of cloud-based services employed with the shared object 110 to the act of developing a native mobile application 112. The act 112 is required, for example, where the object sharing system allows users to use their mobile device to communicate with either or both of the cloud-based services and the shared object. Here, the company operating the object-sharing business is forced to hire a mobile app developer. This provides still another example of a resource that is likely not a part of the company's core skills, a resource that is hard to find and costly to hire.

The process 100 then moves from the act of developing the native mobile application 112 to the act of deploying the shared object in a common area for sharing 114. The act of deploying 114 provides end users with access to the object for use. Because the act of deploying 114 occurs subsequent to the preceding acts illustrated in the process 100, the company operating the object-sharing business has already committed a substantial investment to develop their proprietary platform before obtaining their first customer.

The process 100 continues after launch when it moves from the act of deploying the shared object in a common area for sharing 114 to the act of providing field support for the objects 116. Here, the operator must build a team of field support personnel to maintain the objects in a fully operational state available for use. The failure to do so creates serious customer issues, complaints and poor reviews by their customers that are publicly shared. Ultimately, the operator's business can fail if they do not quickly build-out their field support staff capable of effectively maintaining the shared objects.

In addition to the field support team, the preceding acts require the creation and integration of a multi-disciplined hardware and software engineering team to address a host of engineering and design challenges. Given the high level of demand for these resources, finding and paying for the correct skill set can be prohibitive.

The process 100 also demonstrates the serious financial commitment and financial risk that faces any company that wishes to enter the sharable economy with a sharable offering of its own. Before securing its first customer the company faces a huge business risk. That is, there is no certainty that the company will successfully execute all the design and feature integration required before it launches. The preceding is then followed by market risk. That is, will enough customers adopt their sharable offering? Further, once the sharable objects are launched the company is faced with creating a field support workforce. Depending on the geographic distribution of the shared objects, such workforces may have to be established across the country or even on a worldwide basis. Typically, this is the company's first experience with field support creating an even more daunting challenge.

SUMMARY OF INVENTION

Therefore, there is a need for systems, apparatus and methods for an object-sharing managed service suitable for use with any of a variety of object-sharing vertical markets by any of a variety of object-sharing providers. According to some embodiments, the approaches described herein provide a universal and open platform for object sharing suitable to a wide variety of vertical markets. This allows various object-sharing providers to quickly develop and deploy their objects including object-intelligence, cloud connectivity and powerful data analytics. The approaches described herein also eliminate much of the redundant effort performed by different companies as they enter different object-sharing markets. According to further embodiments, the approaches described herein include field support provided once the shared objects are deployed.

Some embodiments described herein allow the object-sharing provider to quickly and efficiently deliver objects to vertical markets that are new to them. In various embodiments, the cost and efficiency for development, rollout and launch is greatly improved because it is unnecessary for the provider to custom engineer the bulk of the hardware and software required to deliver the object-sharing platform to the new market. According to further embodiments described herein, the object-sharing managed service includes cloud-based services that can be utilized in the various object-sharing vertical markets serviced by various object-sharing companies, respectively. According to various embodiments described herein, the object-sharing managed service allows object-sharing companies to quickly and efficiently add intelligence to their products and to integrate their object-sharing infrastructure into a previously developed cloud-platform (provided by a single system administrator) to facilitate the sharing of the objects.

According to various aspects, the systems, apparatus and methods described herein, provide an infrastructure that facilitates development of object-sharing platforms that allow users to locate, share and return objects located in a common area. In various embodiments, the object-sharing infrastructure includes both cloud resources and software tools (for example, APIs) that facilitate communication between the objects being shared and cloud resources. In further embodiments, the cloud-based services include data aggregation and data analytics. These services are available to any object-sharing provider from the system administrator based on data concerning the set of objects that they share within their platform. Further, the system administrator can provide the same set of cloud services and APIs to the different object-sharing providers in the same or different vertical markets.

According to various embodiments, the object sharing platforms can be employed in a wide variety of object-sharing vertical markets including transportation markets (where the shared objects can include, for example, cars or bicycles), battery charging markets (where the shared objects can include, for example, mobile device chargers or electric vehicle charging stations), furniture markets (where the shared objects can include, for example, conference tables or study carrels) and office equipment markets (where the shared objects can include, for example, photocopiers or color printers).

According to one aspect, a system is configured to provide managed services for deployment of shared tangible objects by an operator, where the managed services are provided by a system administrator and include field support of the shared tangible objects. The shared tangible objects are employed by end users. Further, the system administrator differs from the operators. According to some embodiments, the system includes cloud resources provided by the system administrator. In one embodiment, the cloud resources include an inventory management module configured to be remotely accessed by field support personnel, the field support personnel providing the inventory management module with information concerning a location and an operating condition of the shared tangible objects, the inventory management module accessible to the operators; a device activation module configured to process information concerning the end users to determine whether activation of the shared object should be authorized for use by a selected end user; and a sharable-object command module configured to communicate signals employed in activating shared tangible objects for use when the end user is successfully authorized by the device activation module. According to this embodiment, the system also includes a database coupled to the inventory management module where the database is configured to store the location and operating condition of the shared tangible objects provided via the field support personnel.

According to a further embodiment, the system includes an API provided by the system administrator, the API configured to facilitate a communication of object activation signals from the sharable-object command module to at least one of a client device and the shared tangible object to allow the end user to use the shared tangible object. According to a still further embodiment, the same API is employed to facilitate the communication of object activation signals for different types of shared tangible objects that can be provided in different vertical markets. According to some further embodiments, the activation process and associated API facilitate bi-directional communication between the sharable-object command module and either or both of the client device and the shared tangible object.

According to another aspect, a method of providing cloud-based managed services to support deployment of shared tangible objects is provided. The shared tangible objects are employed by end users. In some embodiments, the deployment is provided by operators including a first operator responsible for a first type of shared tangible object and a second operator responsible for a second type of shared tangible object, the cloud-based managed services are provided by a system administrator and include field support of the shared tangible objects by field support personnel provided by the system administrator. According to a further embodiment, the managed services include an inventory management module and a database coupled to the inventory management module. According to one embodiment, the method includes an act of receiving, by the inventory management module, information from the field support personnel concerning, for each of the first type of shared tangible object and the second type of shared tangible object, respectively, at least one of an operating condition of the shared tangible objects and location information of the shared tangible objects where the information is stored in the database.

In a further embodiment, the method also includes acts of maintaining, by the system administrator, the database with the at least one of the operating condition and the location information provided by the field support personnel; permitting access to the inventory management module by the first operator responsible for the first type of shared tangible object; permitting access to the inventory management module by the second operator responsible for the second type of shared tangible object; providing, by the system administrator for each of the first type of shared tangible object and the second type of shared tangible object, respectively, a device activation module included in the cloud resources, the device activation module configured to process information concerning the end users to determine whether activation of the shared tangible objects should be authorized for use by a selected end user; providing, by the system administrator for each of the first type of shared tangible object and the second type of shared tangible object, respectively, a sharable-object command module included in the cloud resources, the sharable-object command module configured to communicate signals employed in activating the shared tangible objects for use when an end user is successfully authorized by the device activation module; and providing, by the system administrator for each of the first type of shared tangible object and the second type of shared tangible object, respectively, an API configured to facilitate communication between the shared tangible objects and the sharable-object command module, the communication including communication of object activation signals.

According to one embodiment, the first operator and the second operator are different than the system administrator responsible for the cloud-based managed services. According to a further embodiment, the same API is employed to facilitate communication between the shared tangible objects and the sharable object command module for a plurality of different types of shared tangible objects. In still another embodiment, each of the plurality of different types of shared tangible objects are deployed in respective vertical markets that are different from one another.

As used herein, "system administrator" refers to the party operating the cloud-based services that are provided to companies that are operating an object-sharing business. One of skill in the art will recognize in view of the disclosure provided herein that a system administrator refers to a party responsible for activities such as hardware design, software design, field support and cloud-services operation and maintenance.

As used herein, "operator" refers to the party operating an object-sharing business. As defined herein, operators are customers of the system administrator. As described herein, the system administrator provides, depending on the embodiment, a suite of software that can include cloud-based software, embedded software and hardware solutions. End users are the customers of the operators who fill the needs of the end users for the shared tangible objects in the shared economy based on the solutions provided to the operators by the system administrator.

As used herein, "type" when referring to a shared tangible object refers to a specific type of goods. Examples include a portable charging solution object-type, and an automobile object-type and an office furniture object-type.

As used herein, "device activation" refers to placing a shared tangible object in an operational state in which it can be employed for its intended use by an end user.

As used herein, "vertical market" refers to the business segment served by the operators' enterprise. As will be apparent to one of ordinary skill in the art based on the disclosure provided herein, an operator serving a particular vertical market may provide one or more types of shared tangible objects to their customers within that vertical market. Further, the shared tangible object may be a part of the primary goods and/or services the operator provides in the vertical market. Alternatively, the shared tangible object may be included as an ancillary offering the operator provides to their customers in the vertical market. For example, an educational institution is in education as their vertical market. Where the educational institution is an operator it can provide students with shared tangible objects such as portable power chargers or bicycles located around campus. These two types of objects provide only two examples among many possibilities. According to these examples, the system administrator provides the university with a turnkey solution to allow the university to efficiently deploy the shared tangible object without the burden of developing the platform themselves. Further, the preceding demonstrates an example of an operator that is providing shared tangible objects as an ancillary offering to their customers who are purchasing the educational service provided by the university.

In other embodiments, the system administrator provides an operator with the platform and tools to launch an object-sharing platform in the operator's vertical market. Here, for example, the system administrator can deliver cloud-based solutions and embedded software to a transportation company (bike, scooter, car, etc.) for use in the transportation company's primary offering in a transportation vertical market. According to this example, the solutions provided by the system administrator allow the transportation company to move directly forward with an offering for a shared transportation object. According to a further embodiment, the system administrator offers the same, at least in part, turnkey solution (cloud-based solutions and embedded software) to each of the university and the transportation company. The solution can be for the same type of shared tangible object or a different type of tangible object. Thus, in some embodiments, the system administrator provides solutions for the same type of shared tangible object across different vertical markets. In a further embodiment, the system administrator provides solutions for different types of shared tangible objects in different vertical markets. In a still further embodiment, the system administrator provides solutions for the same type of shared tangible objects in the same vertical market, for example, providing solutions to operators competing in the same space.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
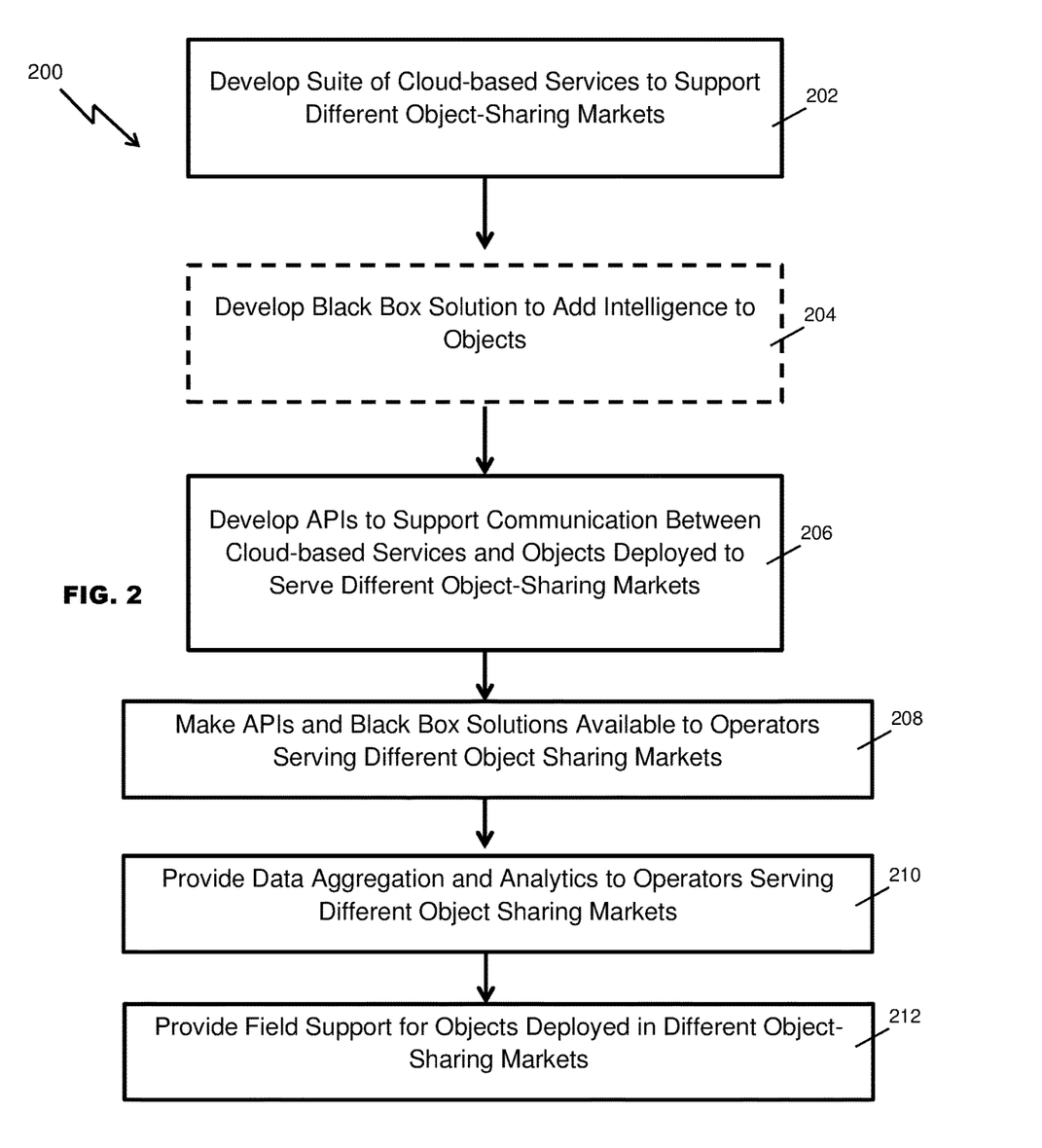
FIG. 2 illustrates a flow diagram of a process for developing and deploying a shared tangible object in accordance with one embodiment.

The embodiments described herein facilitate a business-to-business-to-consumer approach, where a system administrator provides a platform including a sophisticated backend and other software tools as a service to companies interested in launching a shared object business. The companies then deliver the shared tangible objects to end users. Referring now to FIG. 2, a flow diagram of a process 200 for developing and deploying a shared tangible object is illustrated in accordance with one embodiment. The process 200 includes an act of developing a suite of cloud-based services to support different object-sharing markets 202, an act of developing a black box solution to add intelligence to the shared tangible objects 204, an act of developing APIs to support communication between cloud-based services and the shared tangible objects deployed to serve different object-sharing markets 206, an act of making the APIs and black box solutions available to operators serving different object-sharing markets 208, an act of providing data aggregation and analytics to the operators serving different object-sharing markets 210, and an act of providing field support for tangible objects deployed in different object-sharing markets 212. The "different object-sharing markets" as used here refers to different vertical markets.

According to various embodiments, the process 200 is performed by the system administrator and provided as a service to companies operating a shared tangible object platform. The act of developing a suite of cloud-based services to support different object-sharing markets 202 includes the development, by the system administrator, of a backend that can provide a suite of services for each operator (for example, the same suite of services) regardless of the vertical object-sharing market the operator is engaged in. Further, while the suite of services may include the same overall software architecture and functional software modules for each operator, the system administrator also possesses the knowledge, experience and staff to provide solutions that are customized. According to one embodiment, the release of the suite of cloud-based services is provided elsewhere in the process, for example, at the act of making the APIs and black box solutions available to operators serving different object-sharing markets 208.

The functionality of the cloud-based services is explained in greater detail with reference to FIG. 4. Some examples of functional elements that can be utilized by operators in any vertical object-sharing market include: end user management, object activation, advertising, data analytics, data storage, object location and condition tracking, and inventory management. According to various embodiments, the approaches described herein are beneficial to operators in object-sharing markets because the system administrator provides a fully developed suite of cloud-based services that meet the operators' needs. Depending on the embodiment, the operator accesses the cloud-based services via a web application and/or a native mobile application. The process 200 can optionally include the act of developing a black box solution to add intelligence to the shared tangible objects 204. In the illustrated embodiment, this act is shown as optional because a black box solution may not be need in some cases, or alternatively, the operator may deliver the black box solution in some other situations. As used herein, the "black box" or "black-box solution" generally refer to a solution that is integrated into the shared tangible objects provided to the market by the operator. The black box can be provided in one of any number of forms depending on the embodiment and requirements of the application. For example, the solution may be solely a software solution that is provided to the operator. The operator can then integrate the code into their shared tangible object before it is deployed. The solution can also include a hardware element in various embodiments. As one example, the system administrator can design and build an electronic system including, for example, a processor and memory to allow information received by the shared tangible object to be processed and acted upon in response (for example, the shared tangible object can be unlocked by the black box so that the object is available for use). According to one embodiment, the black box solution includes a communication system to allow the black box to receive and/or transmit information wirelessly, for example, via a BLUETOOTH protocol (including BLE as one option), Wi-Fi or cellular networks.

According to further embodiments, the black box is in form of the activation device 700 shown in FIG. 7 of U.S. Provisional Application Ser. No. 62/358,598 incorporated herein by reference and as described therein in accordance to various embodiments. According to some embodiments, the system administrator provides the same black box solution for a plurality of different types of shared tangible objects. In still another embodiment, each of the plurality of different types of shared tangible objects is deployed in respective vertical markets that are different from one another. Thus, in some embodiments, the system administrator provides a universal black box that delivers a turn-key solution to the different operators who are operating in different markets.

According to still another embodiment, the system administrator provides the operator with a micro-chip complete with firmware such that the shared tangible object is suitable for use with the cloud-based services when the micro-chip is integrated into the object. According to one embodiment, the micro-chip is an off the shelf device (for example, a microcontroller) with firmware developed by the system administrator for a particular application. According to another embodiment, the micro-chip is provided as an application specific integrated circuit (ASIC) developed by the system administrator for the application. According to some other embodiments, the system administrator develops firmware to provide a universal micro-chip that delivers a turn-key solution to the different operators who are operating in the different sharable-object markets.

In general, when shared tangible objects are deployed they are each uniquely identified to provide an ability to track location, use and condition of the object. Thus, functionally the black box solution may also include a form of identification for each object. This can be provided by any of the preceding described approaches that provide a unique identification for each tangible object. In a further embodiment, the black box includes a network MAC address, an RFID tag or other item suitable to uniquely identify each tangible object.

The process 200 also includes developing APIs to support communication between cloud-based services and the shared tangible objects deployed to serve different object-sharing markets 206. Here, the system administrator develops the API or APIs necessary for remote access to the cloud-based services developed, for example, at the act 202. Depending on the embodiment, these APIs are employed by the operator and/or end users to communicate via the cloud to one or more element of the cloud-based resources provided by the system administrator. According to one embodiment, the APIs can be a set of APIs for sending and receiving data. Because the APIs are made available as part of the service provided by the system administrator, this act helps provide a turn-key solution for operators of object-sharing platforms in various vertical markets. Further, in some embodiments, the same APIs are employed for object-types in each of the various vertical markets.

As is seen from the preceding, the bulk of the technical solutions are provided by the system administrator. Thus, the availability of the cloud-based services, black-box solutions, APIs and any other hardware and software resources provided by the system administrator allows operators to focus on their market and their customer-facing challenges.

The process moves to the act making the APIs and black box solutions available to operators serving different object-sharing markets 208. According to some embodiments, a common set of API's and black box solutions are made available by the system administrator at act 208. According to these embodiments, these common API and black box solutions are suitable for use by operators serving the different object-sharing markets. In a further embodiment, these features are made available along with cloud-based services that are suitable for use by operators serving the different object-sharing markets. The result is a full set of turn-key solutions that allow companies interested in entering any of a number of vertical object-sharing markets to quickly and cost effectively develop and deploy their own object sharing solution to customers.

With the preceding solutions implemented, the operators in different object-sharing markets can also receive additional resources and services provided by the system administrator. For example, the cloud resources can include a variety of resources that are used by operators to monitor results and improve performance of their shared tangible object platform. The act of providing data aggregation and analytics to the operators serving different object-sharing markets 210 is one example. According to these embodiments, the cloud-based services allow and operator to view statistics concerning the use of shared tangible objects, customer feedback and the reliability and performance of the shared tangible objects over time. As one example, use-based statistics can allow the operator to optimize a deployment of the shared tangible objects.

The system administrator can also provide additional resources to operators because they have experience in manage shared tangible objects in disparate geographic locations. For example, a fleet of transportation sharables will require service on a periodic basis and in emergencies. Because the system administrator is assisting a wide variety of object sharing operators, they likely have considerable experience regarding field support. In some cases they may even have personnel trained in the particular type of shared tangible object that an operator has deployed. Thus, the act of providing field support for tangible objects deployed in different object-sharing markets 212 is included in the process 200 in accordance with the illustrated embodiment. This act illustrates an example where the system administrator can provide resources that directly eliminate the need for the operator to hire and train their own additional staff.

Further, in accordance with various embodiments, the process 200 includes an act of obtaining the tangible object for sharing performed by the system administrator. As one example, the system administrator may already have a supply chain for the type of object the operator is interested in sharing. For example, the system administrator may already be purchasing or leasing the same type of object for other operators in the same vertical market. A new operator in that vertical market can simply approach the system administrator for the turn-key solutions provided by the above described embodiments and ask that the system administrator also provide the shared tangible objects for deployment. The system administrator provides these tangible objects equipped with the black box, if necessary, for integration of the tangible objects into the platform including cloud services provided by the system administrator, for example, as illustrated in FIG. 4.

Portable power chargers provide one example in which a system administrator can provide the shared tangible objects in a deployment ready state to multiple different operators. The operators in this example may be different universities, airports or bars to name just a few possibilities. The operator receives the shared tangible objects and can deploy them as they see fit on their premises. The system administrator activates the cloud-based services for that operator and those objects and the system is operational.

In addition to the preceding, the process 200 can also include a development and release of web applications and/or native mobile applications that allow the operators, end users, field support personnel and the manufacturers of the shared tangible objects to remotely access the cloud services as described in more detail with reference to FIG. 4.

Figure 3:
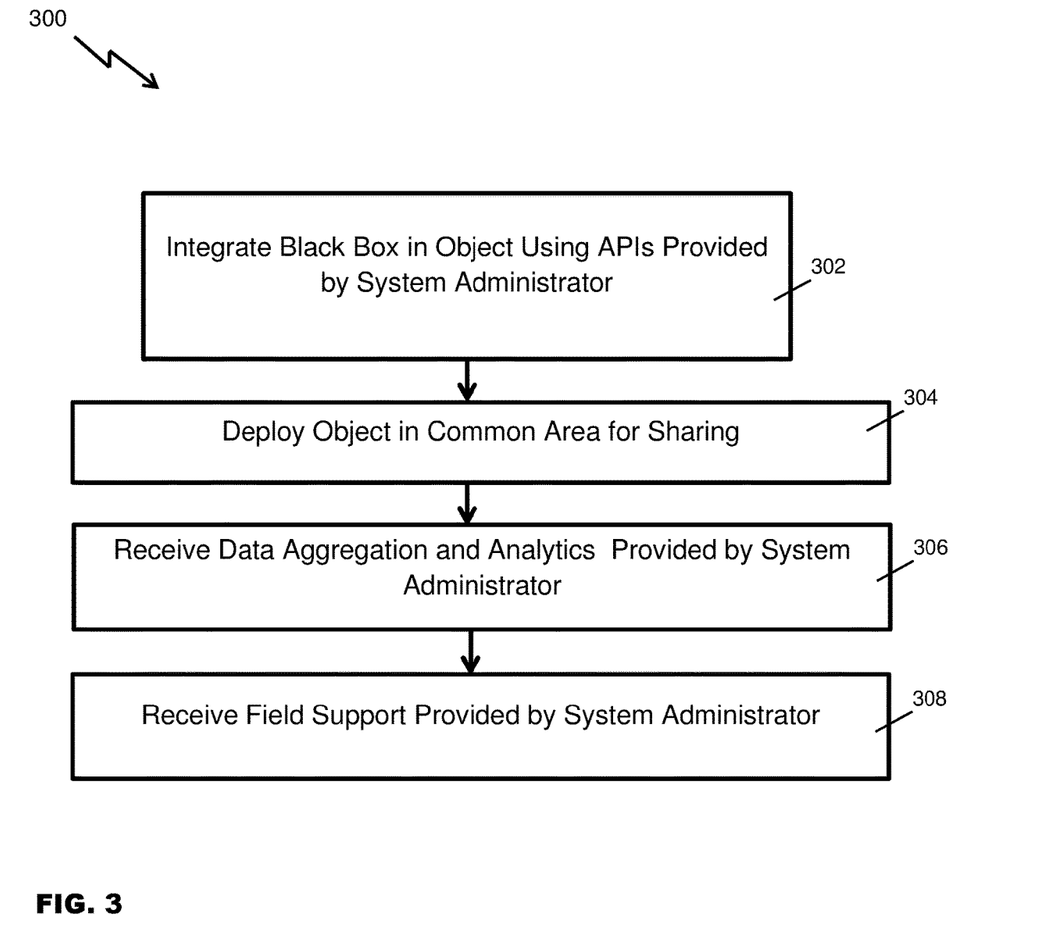
FIG. 3 illustrates a flow diagram of a process for developing and deploying a shared tangible object in accordance with a further embodiment.

Referring now to FIG. 3, a flow diagram of a process 300 for developing and deploying a shared tangible object is illustrated in accordance with a further embodiment. According to this embodiment, the process 300 is illustrated from the perspective of an operator of an object-sharing business. According to the illustrated embodiment, the process 300 includes an act of integrating the black box in the object and using the API(s) provided by the system administrator 302, an act of deploying the object in a common area for sharing 304, an act of receiving data aggregation and analytics provided by the system administrator 306, and act of receiving field support provided by the system administrator 308.

According to the illustrated embodiment, the process 300 begins at the act of integrating the black box in the object and using the API(s) provided by the system administrator 302. Here, the system administrator either provides a newly created solution for the operator or delivers a previously prepared solution to add intelligence to the shared tangible object. Depending on the embodiment, the "intelligence" referred to here can provide the object with technology that allows the object to provide any one of, each of, a combination of or other combinations of the following attributes: a) allows the object to be uniquely identified; b) allows the object to wirelessly receive and/or transmit information; c) allows the object to communicate status information, for example, currently in use, requires service, etc.; d) allows the object's geographic location to be identified; e) allows the object to change from a "locked" state to an "unlocked" state, that is, device activation; and f) allows the object to communicate data and statistics concerning the nature and type of use the object has seen.

According to some embodiments, the intelligence provides the object with an ability to communicate with the cloud-based services provided by the system administrator. According to one embodiment, the communication is a direct communication that does not involve the transmission of information via a user's mobile device. According to another embodiment, the communication is an indirect communication such that information is first communicated to a user's mobile device before all or a portion of the information is communicated to the cloud-based services. Communication of information from the cloud-based services to the object can also employ the user's device. According to further embodiments, the black box facilitates both direct and indirect communication between the object and the cloud-based services.

According to some embodiments, the operator of the object-sharing business participates with the system administrator in the design of the black-box solution. Regardless, at act 302, the operator either integrates the black-box solution in the tangible objects or contracts to have the integration completed by a third party in accordance with this embodiment. The actual integration process will vary depending on the embodiment based on the form of the black-box solution that is employed, for example, as described in various ones of the above-examples. In an alternate embodiment, the system administrator delivers a deployment-ready shared tangible object to the operator as described above with reference to FIG. 2.

With the black-box solution integrated in the object, the process 300 moves to the act of deploying the object in a common area for sharing 304. Here, the objects are made available for end users to use as appropriate for the object-type that is deployed. According to one embodiment, the common area is a location that is open to the public. According to another embodiment, the common area is a location that is not open to the general public but is accessible to a group of potential users. A university or private school that deploys portable chargers is one example of a private location that is accessible to a group of users who are interested in sharing a tangible object, the portable power chargers.

According to one embodiment, the act of deploying the object in a common area for sharing 304 is performed by the system administrator. This approach provides additional value to the operator.

With the objects deployed for use, the process 300 moves to the act of receiving data aggregation and analytics provided by the system administrator 306 in accordance with the illustrated embodiment. The preceding is one benefit provided to operators by the approaches described herein. Here, the operator is able to access cloud-based resources operated and maintained by the system administrator. For example, information concerning use-data, object status, etc. is collected using cloud-based resources and then stored on databases operated by the administrator and accessible to the operator via the cloud. According to further embodiments, the stored data is analyzed for performance metrics, usage trends, etc. all available to the operator for the objects that they've deployed. According to a further embodiment, the operator is able to utilize the cloud-based resources to generate custom reports and analytics.

Another benefit to operators is provided at the act of receiving field support provided by the system administrator 308 included in the process 300 according to the illustrated embodiment. Here, the operator utilizes staffing provided by the system administrator to handle operational problems and user concerns regarding the shared tangible objects that are deployed as a part of the operator's object-sharing business.

Figure 4:
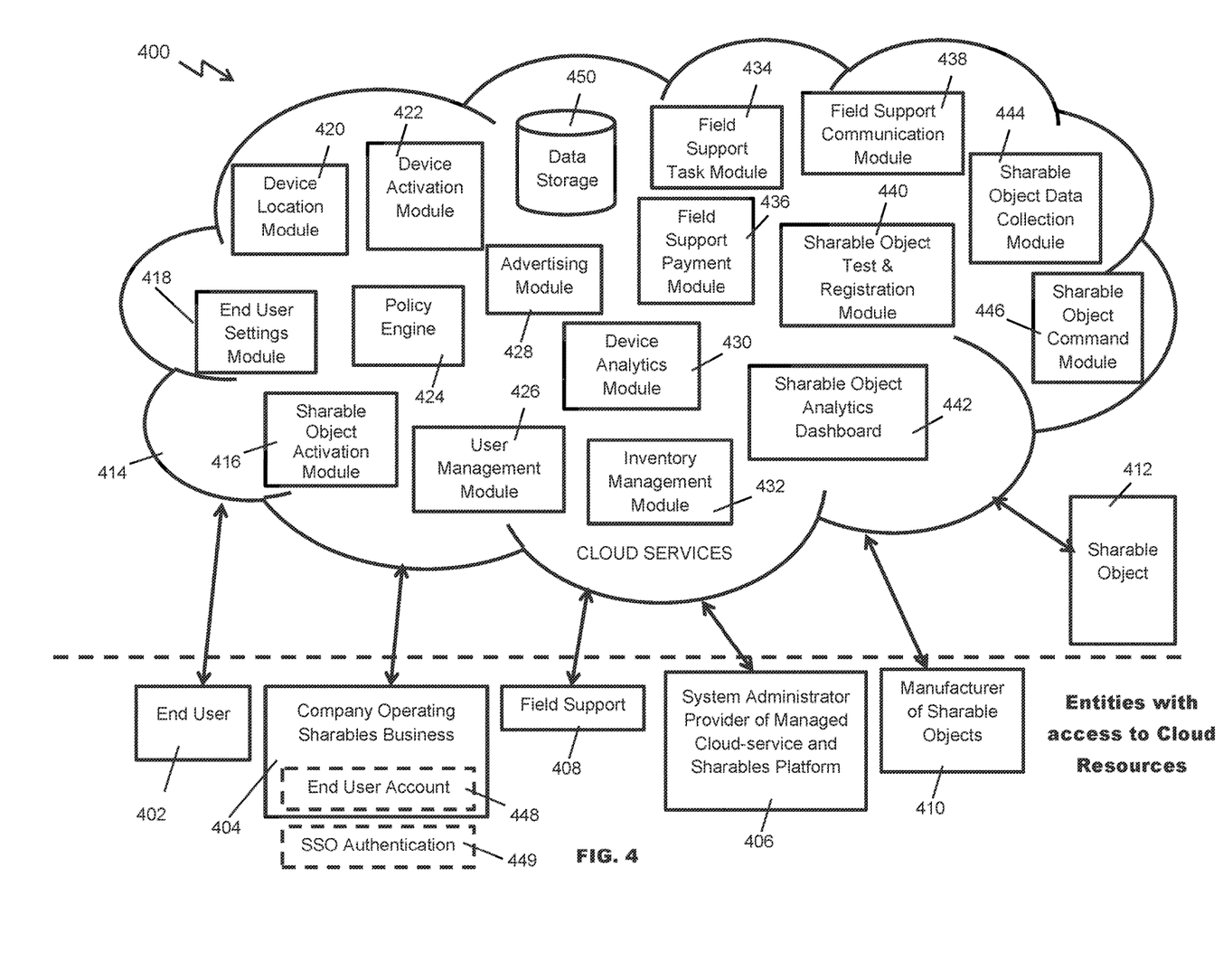
FIG. 4 illustrates a system including a network operating environment for sharable objects.

Referring now to FIG. 4, a system 400 including a network operating environment for sharable objects is illustrated. Access to various portions of the system 400 via the network is available to a plurality of different entities. In general and according to various embodiments, the system is utilized by end users 402, one or more companies operating an object-sharing business (i.e., operators) 404, and a provider of managed cloud-service and a sharables platform (i.e., system administrator) 406. According to further embodiments, the system 400 can also be utilized by field support personnel 408 and manufacturers of shared tangible objects 410. The system 400 allows one or more shared tangible objects 412 to be deployed and managed for a shared use by the end users 402.

The system 400 includes services 414 that are accessible to the end users 402, operators 404, system administrator 406, field support personnel 408, manufacturers 410 and shared tangible objects 412 via one or more networks (not illustrated). In the illustrated embodiment, the services 414 include a sharable object activation module 416, an end user settings module 418, a device location module 420, a device activation module 422, a policy engine 424, an end user management module 426, an advertising module 428, a device analytics module 430, an inventory management module 432, a field support task module 434, a field support payment module 436, a field support communication module 438, a manufacturer's sharable-object test and registration module 440, a manufacturer's sharable object analytics dashboard 442, a sharable object data collection module 444 and a sharable object command module 446.

The services 414 also include data storage 450 which can be in the form of data stores accessible to one or more of the entities illustrated in FIG. 4. According to some embodiments, the data storage includes one or more databases. The databases can store user identification information (for example, user IDs and passwords), payment information, digital content, other information associated with the user such as their social network/contacts and/or other preferences, and information concerning digital content providers, host-facilities where shared tangible objects are deployed and the objects deployed by the operators. Depending on the embodiment, the databases can include any of a relational database, an object-oriented database, an unstructured database, or other database. Further, the databases can be included in any aspect of a memory system, such as in RAM, ROM or disc, and may also be separately stored on one or more dedicated data servers included in the services 414.

In one embodiment, the data storage 450 can be centralized for all the modules included in the services 414. In another embodiment, at least some of the data storage is included in one or more of the modules. For example, modules such as the end user settings module 418, the policy engine 424 and the user management module 426 include data storage according to one embodiment. In a further embodiment, the sharable object test and registration module 440, the sharable object analytics dashboard 442 and the sharable object data collection module 444 include data storage. In addition, the data stores can be secured such that a first entity-type such as an end user is only able to access the data stores that include their personal information. In a further embodiment, access is restricted such that an operator has access to a first data store concerning the shared tangible objects 412 under their control while the system administrator has access to the first data store and other data stores concerning shared tangible objects 412 deployed for other operators.

As should be apparent to one of ordinary skill in the art in view of the disclosure provided herein, the services 414 can include other services and/or resources and combinations of services and/or resources different than those described above depending upon the embodiment. As one example, functionality provided by the sharable object analytics dashboard 442 and the sharable object data collection module can be provided in a single "manufacturer focused" module included in the services 414. As another example, functionality provided by the policy engine 424 and the user management module 426 can be included in a single module included in the services 414.

It will also be apparent to those of ordinary skill in the art in view of the disclosure provided herein that elements of the services 414 can communicate with one another to share information. For example, information provided by the sharable object activation module 416 can be employed by the sharable object command module 446.

In general, the system 400 operates to allow end users to activate the sharables objects 412. According to some embodiments, the end user is in possession of a client device, for example, a portable electronic device such as a smart phone or tablet that is employed in the process of activating the sharable tangible object 412 for use.

According to some embodiments, the sharable object activation module 416 is accessed by an end user 402 to provide the services 414 with the information needed to authorize and/or authenticate the end user before the sharable object 412 is activated for use by the end user 402. Depending on the embodiment, the sharable object activation module is accessed using a web application or a mobile application. The end user settings module 418 is also accessed by the end user 402 in a similar fashion. The end user settings module 418 can be employed by the end user 402 to establish a user identification, login credentials and payment settings specific to the user as some examples.

According to another embodiment, the end user establishes an end user account 448 with the company operating the sharables business using an identity established with another software application, for example, using a single sign-on (SSO) authentication 449. For example, the end user can use a single sign-on authentication 449 established with their Facebook account to sign into the sharables platform and access shared tangible objects 412.

The device location module 420 can be employed by users to locate the nearest sharable tangible object 412 of the type desired by the user. Accordingly, the device location module 420 can employ GPS data provided by the end user's client device to identify a location of the sharable objects 412 and inform the end user 402. In one embodiment, the information is provided in a graphical format such as a 2D or 3D map rendered in a display included in the client device.

The device activation module 422 is employed to process information provided by the user in substantially real-time during an authentication process during which the end user credentials, etc. are evaluated to determine whether they should be authorized to access the shared tangible object 412. According to one embodiment, the device activation module 422 receives information provided by the end user and authenticates the information against information stored in the data storage 450. Depending on the embodiment, the end user 402 can access the device activation module 422 via a web application or a mobile application.

According to other embodiments, additional elements of the services 414 are employed by the device activation module 422 during the end-user authorization and device activation process. The policy engine 424 provides one example of the preceding.

The policy engine 424 allows the operator to establish a set of terms under which the end users 402 can access the shared tangible object 412 for use. For example, depending on the embodiment, the terms can address any of the following alone or in combination, or other terms: a cost for use of the shared tangible object 412; a time period for use of the shared tangible object 412; applicability and/or amount of a late fee applicable to a late return of the shared tangible object 412 following the period for use; and a requirement for collateral to access the shared tangible object 412 for use. According to one embodiment, the device activation module 420 communicates with the policy engine 424 when authorizing the end user before allowing the sharable object 412 to be accessed for use.

According to one embodiment and provided that the end user 402 is successfully authorized, the device activation module 422 provides an activation signal that is communicated to the client device in possession of the end user 402. In a further embodiment, the client device is in communication with the sharable object 412 and transmits the device activation signal to the sharable object 412. According to another embodiment, the device activation module 422 provides an activation signal that is directly communicated to the sharable object 412 provided the end user 402 is successfully authorized.

According to some embodiments, the user management module 426 is employed by the operator 404 to monitor other aspects of the behavior of the end user 402, for example, compliance with the terms included in the policy engine 424. The user management module 426 can provide additional requirements or restrictions on one or more end users 402, for example, as a result of theft or loss of previously shared objects 412. According to one embodiment, the user management module 426 is administered by the operator 406 based on use data received by the services 414.

The advertising module 428 is include in some embodiments, to provide a platform for maintaining and sharing dynamic content (any of text, images, audio and video) with end users 402 during a process of activating a sharable tangible object 412. These approaches are described in detail in accordance to various embodiments in U.S. Provisional Application Ser. No. 62/358,598 incorporated by reference. In some embodiments, a sponsor and/or content owner can provide the services with content that is distributed to end user client devices in exchange for an activation of the sharable objects 412. According to one embodiment, the end user is allowed to access and use the sharable tangible object 412 at no cost when they engage with content distributed by the services 414.

According to one embodiment, the device analytics module 430 provides an analysis of the performance metrics concerning the sharable object businesses operated by one or more operators. Further, the performance for a single operator and a single type of shared tangible object or a single type of shared tangible object at a specific a location can be evaluated. The performance metrics can be use-based, financially-based, a combination of the preceding or based on other data available with the information stored by the services 414. Utilization metrics provide one form of analytics that can assist the system administrator, operators and manufacturers in understanding how to improve performance and maximize the efficiency of an object-sharing business. A return on investment is another metric that can be provided by the device analytics module 430 and utilized by the system administrator and/or operators and manufacturers.

According to a further embodiment, the inventory management module 432 provides the system administrator, the operator and the field support personnel with an ability to monitor and update the location and condition of shared tangible objects that are deployed. For example, the system administrator can work with the operator on a deployment of the shared tangible objects 412, and depending on the embodiment, either the administrator or the operator can update the inventory management module 432 to reflect the newly deployed objects 412. Once the objects 412 are deployed, the field support personnel can provide updates to the condition of the shared tangible objects 412 based on their first-hand review of the objects in the field. According to one embodiment, the system administrator updates status information using the inventory management module 432 based on feedback received from end users.

According to a still further embodiment, the services 414 include a field support task module 434. According to one embodiment, the field support task module 434 is employed by the system administrator to define, track and assign tasks to the field support personnel. The system administrator employs the field support task module 434 to assign work orders to field support personnel for any of a variety of tasks. The scope of the tasks can include routine maintenance performed on the shared tangible objects 412, upgrades performed on the objects 412, troubleshooting performed on the objects 412 and repair or replacement of the objects 412.

According to one embodiment, the field support payment module 436 is employed by the system administrator to administer and execute payments to the field support personnel. In one embodiment, the field support personnel are employees of the system administrator. According to another embodiment, the field support personnel are contracted by the system administrator. According to either embodiment, the system administrator provides field support to the operator as a paid service. This service can be provided to multiple operators in the same or different locations and/or vertical markets. The service can also be provided by the system administrator to the same operator at multiple different geographic locations and/or vertical markets.

According to some embodiments, the field support communication module 438 is employed by the system administrator to provide real-time communication between the administrator and the field support personnel. The ability to communicate in substantially real time is particularly advantageous in situations that require a rapid response, for example, a system outage or other significant disruption in the availability of the shared tangible objects 412. The field support communication module can also provide a log of the communications, for example, dates, times and content of correspondence between the system administrator and the field support personnel. According to one embodiment, the field support communication module 438 supports at least one of email communication and text communication. According to another embodiment, the field support communication module also supports voice communication, for example, voice over internet protocol (VoIP). According to a still further embodiment, the field support communication module 438 supports at least one of video sharing and image sharing.

According to the illustrated embodiment, the services 414 also include services employed by manufacturers of shared tangible objects 412. The sharable object test and registration module 440 provides a first example. According to various embodiments, the sharable object test and registration module 440 is employed by the manufacturer of the shared tangible objects 412 to provide each of the shared objects with a unique identification for use when deployed in an object sharing platform and also to commission the shared object before it is deployed. Depending on the embodiment, the testing performed to commission the objects 412 can include system and/or component level testing of the operations performed by the objects 412 when in normal use. The testing performed to commission the device can also include a test of the device activation process to confirm that the shared object 412 is in the correct operational state (for example, locked-out to prevent use until activated and placed in the operational state once activated). According to another embodiment, all or a portion of the preceding testing and registration is performed by the system administrator.

According to one embodiment, the unique identification that is established for the shared tangible objects 412 during the registration process is employed in the services 414 to allow for features described herein. For example, the identification can provide a way to associate a specific object from among the shared objects 412 with location, use and status data tracked and stored via the services 414.

The sharable object analytics dashboard 442 is employed to provide the manufacturer with performance statistics concerning shared tangible objects 412 that they've commissioned. According to an alternate embodiment, the operator of an object-sharing business can opt out of allowing the manufacturer to access these statistics, for example, for privacy reasons.

The sharable object data collection module 444 is employed to provide detailed information concerning device performance in accordance with one embodiment. For example, where the shared objects 412 are portable power chargers, the data can include data regarding the output voltage and current over time through one or more uses.

In accordance with the illustrated embodiment, the sharable object command module 446 is included in the services 414 provided by the system administrator to the operators of the object-sharing businesses. According to one embodiment, the sharable object command module 446 is employed to communicate the device activation signal that places the shared object 412 in an operational state. Depending on the embodiment, the device activation signal is communicated to at least one of the shared tangible objects 412 and the end user's 402 mobile device. According to these embodiments, the sharable object command module 446 receives input concerning a status of the authentication and/or authorization process performed using the device activation module 422 (described above).

In general, the services 414 are accessed "over-the-cloud" by the plurality of entities with network access. The network can include either or both of local-area networks (LANs), wide area networks (WANs), wireless communication, wired communication and may include the Internet. According to a further embodiment, the network provides access to the services 414 to the end users 402, the operators 404, the system administrator 406, field support personnel 408 and the manufacturers of shared tangible objects 410. Depending on the embodiment, this can include access by any of the preceding to one or more remote devices, servers, application resource management and/or data storage systems including in the services 414. For example, the network can allow communication between any of the end user client devices, the shared tangible objects 412, with one another and/or with any of the other resources illustrated in FIG. 4. Communication can occur using any of Wi-Fi networks, Bluetooth communication, cellular networks and peer-to-peer networks available either alone or in combination with one another via the network. Depending on the embodiment, the network may be any type and/or form of network known to those of ordinary skill in the art capable of supporting the operations described herein. Thus, other communication protocols and topologies can also be implemented in accordance with various embodiments.

In some embodiments, the system administrator provides web applications and/or native mobile applications as needed by the end users 402, the operators 404, the system administrator 406, the field support personnel 408 and the manufacturers of shared tangible objects 410 when accessing the services 414 over-the-cloud. In one embodiment, the system administrator develops a common set of web applications and/or native mobile applications that are employed by the preceding entities with different object-types and in different vertical markets. The preceding can provide a universal solution employed by different operators across these markets.

According to various embodiments, the client devices employed with the system 400 can be, for example, any of a portable device such as a tablet computer, a hand-held computer, a personal digital assistant, an e-reader, a mobile telephone, a camera, a smart phone, and enhance general packet radio service (EGPRS) mobile phone, a media player, a navigation device, an e-mail device, a game console, a laptop computer, or a combination of any two or more of these processing devices and/or other processing devices.

Depending on the embodiment, a client device can include a general purpose processor (CPU), a graphics processing unit (GPU), a memory, a display (for example, a touchscreen) and additional processing devices, for example, a communication module. The client device may have a plurality of input/output interfaces and devices such as a mouse, a joystick, a touchscreen, a keyboard, a camera, an inertial sensing system, a microphone, etc. Further, the client device may include any one or any combination of peripheral devices, for example, a positioning system, an RF transceiver, a motion sensor, a light sensor, a proximity sensor, one or more additional sensors, communications hardware and an audio including the speaker and/or annunciators. In various embodiments, any of the preceding peripheral devices, alone or in combination with other peripheral devices or other devices generally, can be employed as an input/output interface.

According to some embodiments, the client devices can display one or more graphical user interfaces to provide the user access to various system objects (for example, a display object) and for conveying information to the user. A non-exhaustive list of examples of such system objects include device functions for tools used to: establish a user account; interact with digital content; communicate with the services; communicate with the shared tangible objects 412; communicate with other client devices; and presentation of analytics, alerts, events or other visual references graphically represented. Accordingly, one or a plurality of icons can be rendered for viewing and/or selection in the display via either a touch input, or other input such as a cursor rendered in the display, a voice input or a motion input sensed by the client device.

According to some embodiments, tools are provided to end users in a digital content distribution and device activation application that the user downloads to the user's mobile device. For example, the application can be downloaded from an application server included in the services 414. According to some embodiments, the application server is hosted by a third party service, for example, in an application store or other digital application distribution platform from which other applications can also be accessed and downloaded (well-known current examples include the iOS App Store operated by Apple, the Amazon App store and Google Play). In one embodiment, the application includes a web-application to allow can activation of a shared tangible object using any device with a web browser. According to this embodiment, the application server allows distribution of an application that does not include a native application built for a specific operating system. Thus, the application can be employed across a much wider range of devices.

While embodiments are described in which operators deliver shared tangible objects in different vertical markets, in other embodiments, the system administrator can provide the same or similar solution to two operators in the same vertical market. For example, the system administrator can provide solutions employed by two different operators who provided their customers bicycles as the shared object.

The processes described and process diagrams provided herein can include the same steps in a different order, the addition of steps or the elimination of certain steps. In addition, acts or portions thereof may be performed simultaneously. For example, the act of developing a black box solution to add intelligence to the shared tangible objects 204 and the act of developing APIs to support communication between cloud-based services and the shared tangible objects deployed to serve different object-sharing markets 206 can be performed together in accordance with one embodiment. As another example, the act of developing a suite of cloud-based services to support different object-sharing markets 202 and the act of providing data aggregation and analytics to the operators serving different object-sharing markets 210 can be performed together.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system configured to provide managed services for deployment of a plurality of shared tangible objects including a first type of shared tangible object deployed by a first operator and a second type of shared tangible object by deployed by a second operator, the managed services provided by a system administrator, the system administrator different than both the first operator and the second operator, the plurality of shared tangible objects employed by a plurality of end users, each of the plurality of end users in possession of a mobile device, the system comprising:
   resources provided by the system administrator, the resources including:
   a sharable-object command module configured to communicate an object activation signal employed in activating any one of the plurality of shared tangible objects for use by an end user selected from the plurality of end users, the activation occurring after the selected end user is successfully authenticated; and
   at least one API configured to facilitate bi-directional communication between the sharable-object command module and at least one of the mobile device and the plurality of shared tangible objects including the first plurality of shared tangible objects and the second plurality of shared tangible objects, the bi-directional communication including communication of an object activation signal.

2. The system of claim 1, wherein the second type of shared tangible object is different than the first type of shared tangible object.

3. The system of claim 2, wherein the second operator is different than the first operator.

4. The system of claim 1, wherein the system administrator includes a first business entity,
   wherein the first operator includes a second business entity,
   wherein the second operator includes a third business entity; and
   wherein the first entity is different than both the second entity and the third entity.

5. The system of claim 4, wherein at least one of the first type of shared tangible object and the second type of shared tangible object originates from the system administrator.

6. The system of claim 1, wherein at least one of the first type of shared tangible object and the second type of shared tangible object include a power charger.

7. The system of claim 1, wherein the first type of shared tangible object is configured for use in a first vertical market; wherein the second type of shared tangible object is configured for use in a second vertical market; and wherein the first vertical market is different than the second vertical market.

8. The system of claim 1, wherein the API is configured to facilitate communication of the object activation signal to the mobile device.

9. The system of claim 1, wherein the API is configured to facilitate communication of the object activation signal to the plurality of shared tangible objects.

10. The system of claim 1, wherein the resources include a device activation module configured to process information concerning the plurality of end users to determine whether activation of a selected one of the plurality of shared tangible objects should be authorized for use when selected by an end user included in the plurality of end users.

11. The system of claim 1, wherein the resources include a policy engine accessible to each of the first operator and the second operator, the policy engine configured to allow the first operator to establish a first set of terms under which the plurality of end users access the first type of shared tangible objects for use, and to allow the second operator to establish a second set of terms under which the plurality of end users access the second type of shared tangible objects for use, and
   wherein the second set of terms may include terms that differ from those terms included in the first set of terms.

12. The system of claim 1, wherein the resources include an inventory management module configured to be accessible to each of the first operator and the second operator to identify at least one of an operating condition and a location of shared tangible objects included in the plurality of shared tangible objects.

13. The system of claim 12, wherein the resources include a database coupled to the inventory management module, the inventory management module configured to receive information from field support personnel concerning, for each of the first plurality of shared tangible objects and the second plurality of shared tangible objects, respectively, at least one of an operating condition of the shared tangible objects and location information of the shared tangible objects, the information stored in the database,
   wherein the inventory management module is configured for access by the first operator responsible for the first plurality of shared tangible objects,
   wherein the inventory management module is configured for access by the second operator responsible for the second plurality of shared tangible objects,
   wherein the inventory management module is configured to bar the second operator from accessing information concerning the first plurality of shared tangible objects, and
   wherein the inventory management module is configured to bar the first operator from accessing information concerning the second plurality of shared tangible objects.

14. The system according to claim 1, wherein the API is a first API, and
   wherein the resources include a second API provided by the system administrator, the second API configured to facilitate a receipt of authentication information for the end user via credentials already established for the end user.

15. The system of claim 1, wherein the API is configured to facilitate a transmission of information between a shared tangible object selected from the plurality of shared tangible objects and the sharable-object command module, the transmission of information occurring independent of the mobile device.

16. The system of claim 1, wherein the object activation signal includes a first object activation signal communicated from the sharable-object command module to the mobile device, and wherein a second object activation signal is communicated from the mobile device to a shared tangible object selected from the plurality of shared tangible objects following a receipt of the first object activation signal by the mobile device.

17. The system of claim 1, wherein the resources provided by the system administrator include software code that allows each of the plurality of shared tangible objects to be uniquely identified relative to others of the plurality of shared tangible objects.

18. The system of claim 17, wherein the resources provided by the system administrator are accessible over a wide area network.

19. The system of claim 18, wherein the resources provided by the system administrator allow each of the first operator and the second operator to access data including at least one of performance metrics and usage trends for the first type of shared tangible object and the second type of shared tangible object, respectively.

* * * * *